(12) United States Patent
Anand et al.

(10) Patent No.: US 12,423,120 B2
(45) Date of Patent: Sep. 23, 2025

(54) USER INTERFACE MODIFIER BASED ON APP RECOMMENDATIONS

(71) Applicant: SAP SE, Walldorf (DE)

(72) Inventors: Ashish Anand, Bangalore (IN); Suneet Agarwal, Bangalore (IN)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 18/379,347

(22) Filed: Oct. 12, 2023

(65) Prior Publication Data

US 2025/0123856 A1   Apr. 17, 2025

(51) Int. Cl.
| | |
|---|---|
| G06F 3/048 | (2013.01) |
| G06F 3/0482 | (2013.01) |
| G06F 9/451 | (2018.01) |
| G06F 21/62 | (2013.01) |

(52) U.S. Cl.
CPC ............ *G06F 9/451* (2018.02); *G06F 3/0482* (2013.01); *G06F 21/629* (2013.01)

(58) Field of Classification Search
None
See application file for complete search history.

(56) References Cited

U.S. PATENT DOCUMENTS

| | | | |
|---|---|---|---|
| 2012/0291022 A1* | 11/2012 | Mehta | G06F 8/60 717/176 |
| 2014/0038644 A1* | 2/2014 | Ngo | H04W 4/029 455/456.3 |
| 2014/0143087 A1 | 5/2014 | Ahn et al. | |
| 2018/0192130 A1* | 7/2018 | Liston | H04H 60/46 |
| 2021/0397314 A1* | 12/2021 | Khan | G06F 3/04883 |
| 2022/0038573 A1* | 2/2022 | Gatlin | H04M 1/72472 |

FOREIGN PATENT DOCUMENTS

CN   107885852 A   4/2018

\* cited by examiner

*Primary Examiner* — Thanh T Vu
(74) *Attorney, Agent, or Firm* — Sterne, Kessler, Goldstein & Fox P.L.L.C.

(57) ABSTRACT

Various embodiments for a user interface modification and recommendations system are described herein. An embodiment operates by displaying in a first section of a user interface a plurality of saved/favorite apps of a first user based on a list of saved/favorite apps of the first user. A list of authorized apps is generated from the first list of apps and comparing a user profile of the first user with permissions provided by the client system. A final list of recommended apps is generated by copying a preliminary list and removing all the saved/favorites apps of the first user. The first section of the user interface is updated by adding the at least one app from the final list of recommended apps to the first section.

20 Claims, 6 Drawing Sheets

USER INTERFACE MODIFIER BASED ON APP RECOMMENDATIONS

BACKGROUND

In the computerized world, many devices use apps or applications to provide a user with access to various functionality or services that may benefit the user in one manner or the other. However, as the volume of apps increases, it becomes increasingly difficult for a user to locate which apps are actually going to be valuable to the user.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In the computerized world, many devices use apps or applications to provide a user with access to various functionality or services that may benefit the user in one manner or the other. However, as the volume of apps increases, it becomes increasingly difficult for a user to locate which apps are actually going to be valuable to the user. While some solutions provide for a search engine for a list of apps, the fidelity of that solution relies on the user's ability to enter a meaningful search term and to have corresponding metadata that will match that search term associated with the potentially relevant apps.

Figure 1:
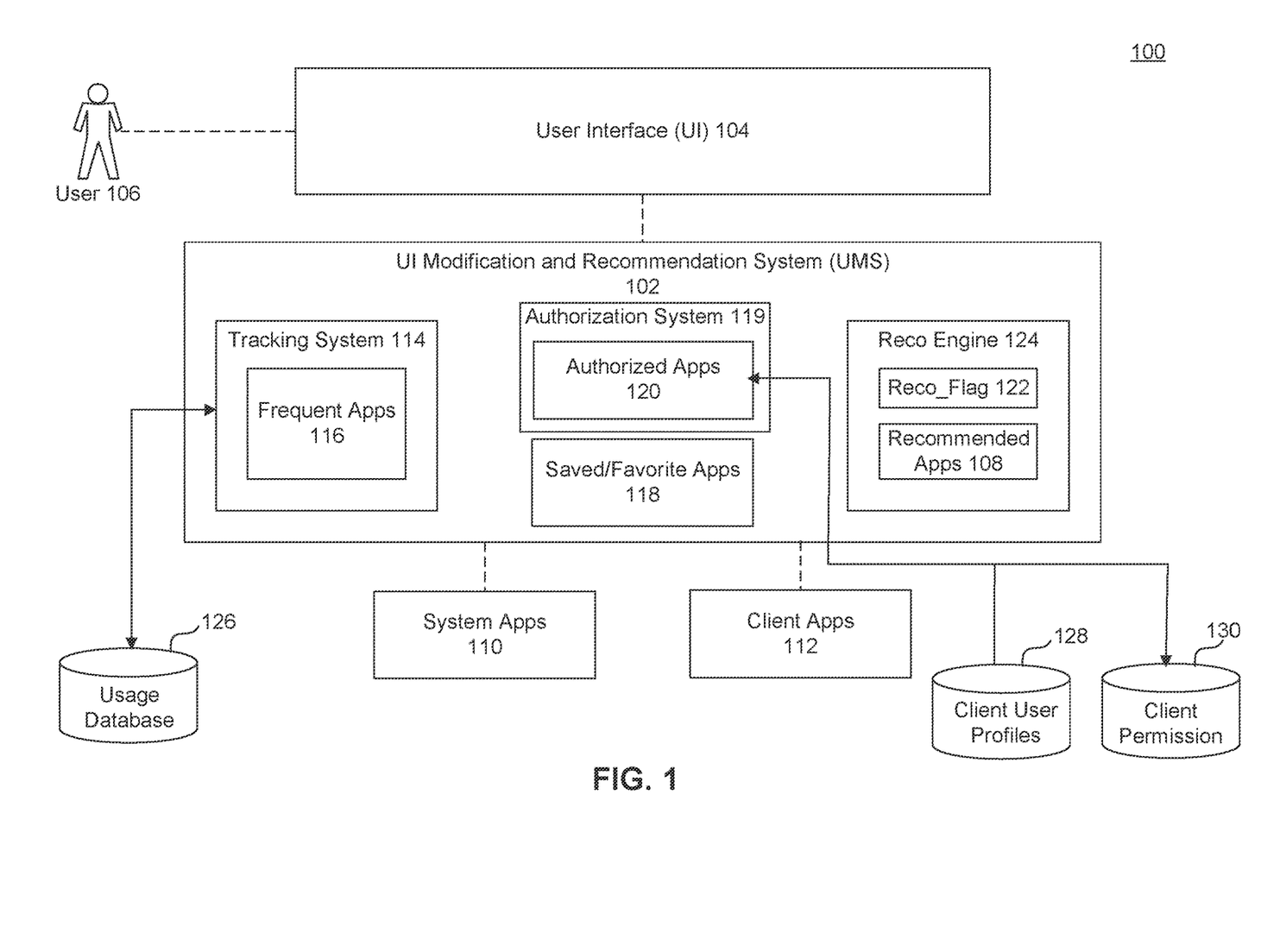
FIG. 1 illustrates a block diagram illustrating a user interface modification and recommendations system (UMS), according to some example embodiments.

FIG. 1 illustrates a block diagram 100 illustrating a user interface modification and recommendations system (UMS) 102, according to some example embodiments. In some embodiments, UMS 102 may identify and recommend different applications, programs, services, or apps to a user 106 that may benefit the user in their usage of a particular system, website, program, or device. UMS 102 may monitor the actions of users, and update the user interface (UI) 104 of a user 106 with newly recommended apps 108 based on the monitoring. The user 106 may then have the option to save, use, download, or even rearrange the UI 104 with the one or more of the recommended apps 108.

User 106 may be any end user, client, or customer who is interacting with a user interface (UI) 104. User 106 may have a user account, login, and password to access an application of user interface 104. UI 104 may include a user interface of a web application, app, program, particular machine, device, or server, or a website, to name a few examples. UI 104 may provide various functionalities accessible to the user via menu options, icons, and may include both built-in functionality accessible to all users 106 and/or one or more various customizable or downloadable apps.

In some embodiments, UI 104 may be the home screen or welcome screen of a computing system (which may be used to operate one or more devices) developed by a first developer. In some embodiments, the computing system may be accessible to various clients (e.g., companies or other organizations), who may have various employees or members who are accessing the system through UI 104 as users 106.

Apps as described herein generally may include any programs, applications, or other functionality that is accessible to one or more users 106 of a system via UI 104. In some embodiments, each app may be a standalone program on UI 104 represented by alphanumeric text and/or an icon. In some embodiments, each app may have a standalone icon on UI 104 that is configurable, movable, selectable, which can be added or removed from UI 104 by user 106 and/or UMS 102.

In some embodiments, there may two general types of apps available to a user 106. The first type of apps may be system apps 110. System apps 110 may be a set of apps that are available to different users of the system of UI 104, across two or more organizations or clients of the system. In some embodiments, the system apps 110 may be developed and/or otherwise made available by a developer of a system or device which UI 104 is configured to communicate or operate.

Client apps 112 may be a set of apps that are developed by an organization or company specifically for members, employees or clients of that particular company. In some embodiments, a first client app 112 developed by a first company may only be available to users 106 who are employees of the first client, while a second client app 112 developed by a second organization may only be available to a subset of the users 106 who are members of the second organization.

For example, there may be three system apps A, B, C, and company 1 may have developed two apps D and E, and company 2 may have developed three apps F, G, and H. If user 106 is a member or employee of company 1, then user 106 may have access to apps A, B, C, D, and E. In some embodiments, company 1 may restrict access to its apps to various employees based on their role, seniority, experience, projects, education, etc. For example, app E may be for human resources personnel only, and user 106 may be a sales manager, and as such may not have access to App E.

Both system apps 110 and client apps 112 (referred to herein together and generally as apps) may be accessible, executable, or may be launched from the same UI 104. In some embodiments, UI 104 may allow a user to access or launch multiple apps at the same time. For example, a first app may be launched in a first window and a second app may be launched in a second window, and the apps may be operating/operated and/or viewed simultaneously from UI 104.

In some embodiments, there may hundreds or even thousands of apps available to user 106 from which to choose to do their job functions or perform other activities. But this large volume of apps may make it difficult for the user 106 to identify and select which apps are best suited for the user 106. This decision on which apps to use becomes even more difficult if different apps have similar, identical, or overlapping functionality-which may cause the user to download multiple apps that provide similar functionality thus using unnecessary bandwidth, storage space, and computing resources, while also causing confusion to the user. This similarity determination may be made based on metadata stored with the apps, such as an identification of which tables, rows, columns of a database are being accessed, or a description of functionality of the apps which are cross-referenced and compared to one another. UMS 102 may both recommend various apps as recommended apps 108, and move or rearrange UI 104 in accordance with the recommended apps 108.

In some embodiments, a tracking system 114 may track the activities of one or more users 106 with UI 104. Tracking system 114 may track which user 106 uses which apps, how often, for how long, during which days/times, which datastores are used by or associated with various apps, even how various users 106 have their UI 104 customized in their accounts (e.g., each user 106 may have a customized and customizable UI 104) for accessing the system, website, or application associated with the UI 104. Tracking system 114 may output individual or group usage statistics of various apps to be stored in usage database 126. In some embodiments, tracking system 114 may retrieve certain usage statistics from usage database 126 in order to provide a recommendation.

In some embodiments, tracking system 114 may identify which are the most frequently apps used by a user 106 (i.e., frequent apps 116). Frequent apps 116 may include those apps that are accessed or used most frequently by a user 106: more than a threshold number of times, used daily, more than a threshold number of times on a weekly or monthly basis, used the most (e.g., in terms of active time or time of interaction with the app), etc. As noted above, these statistics may be stored both on an individual user's usage as well as group usage (e.g., aggregate usage of all employees in a department of a company) in usage database 126. In some embodiments, UI 104 may include a section where frequent apps 116 of either an individual user and/or a group (to which the user belongs) are displayed.

In some embodiments, a user 106 may save various apps that are interesting to the user (i.e. saved/favorite apps 118). Saved/favorite apps 118 may include any apps (system apps 110 and/or client apps 112) that are saved or marked as a favorite by user, or otherwise pinned to the UI 104. In some embodiments, UI 104 may include a section where saved/favorite apps 118 are displayed.

UMS 102 may also include an authorization system 119. Authorization system 119 retrieves user profile data from client user profile database 128. User profile data may include data such as department, company organization information, seniority levels, any project designations, location, or any other data that can be used to identify roles or responsibilities a particular user 106 may have in a company.

Authorization system 119 may also retrieve app permission data stored in client permission database 130. The permission data may generally be created by a client administrator to designate which apps or types of apps may accessed by certain groups of users, or individual users. As examples, authorization system 119 may access user profiles and permissions to determine which groups or users in a particular group may be authorized to access certain apps. Examples include allowing human resources personnel to access recruiting apps, lawyers accessing contract drafting apps, sales representatives access purchase order apps, etc. However, a new employee in the human resources department may be prohibited from accessing the recruiting app until they have been employed for 90 days, or passed a certification exam (which may be indicated in their user profile). In some scenarios, some permissions may be set to automatically require a recommended app 108 to be moved to saved/favorites app 118 where the employer or organization deems them necessary (e.g., a timekeeping app to track the hours worked and time off taken by an employee).

Authorized apps 120 may include a list of apps which the user 106 is authorized to access to use based on their profile and permissions. In some embodiments, authorized apps 120 may two different lists of authorized apps. The first list of authorized apps 120 may include system apps 110 that the user is authorized to use. The second list of authorized apps 120 may include client apps 112 the user 106 is authorized to use. As noted above, authorization may be based on any number of factors including user identifier, role within a company, seniority, projects the user is working on, whether the user has signed up for a subscription etc.

In some embodiments, UMS 102 may not have direct access to the client apps 112 a particular user 106 is authorized to use or access. As such, UMS 102 may generate the second list of authorized apps of the clients apps 112 by requesting from a client server, system, or device. UMS 102 may periodically request or receive updates to the list because which client apps 112 the user 106 is authorized to access may periodically change based on a company or organization's policies, the user's role within the organization, the user leaving or joining the organization, etc.

In some embodiments, UMS 102 may generate the first list of authorized system apps 110 and generate the second list of client apps 112 the user 106 is authorized to use. For example, UMS 102 may access a user profile, from client user profiles database 128, which stores various characteristics or data about a user 106 (such as education, age, company, role, project(s), experience, etc.), UMS 102 may filter out or identify which apps are authorized apps 120 from both the system apps 110 and client apps 112, and combine them into one list of authorized apps 120. This may be beneficial, as it may prevent the system from recommending or displaying any unauthorized apps to which the user 106 may not have access, thus decluttering the UI 104.

As another example of the operations of UMS 102, there may be a set of 300 system apps 110 [Sa1, Sa2, . . . . Sa300]. Sa1 may only be authorized for or accessible to a sales representative, while Sa2 is accessible to a sales manager, Sa300 may be available to a quality engineer. The remaining apps may be accessible to users in different roles.

If user 106 logs in through UI 104, UMS 102 may identify the role of the user 106 as quality engineer (e.g., based on the user profile if provided as part of a log on process or a user identifier used in a login in process to retrieve user profile from client user profile database 128). UMS 102 may then generate a data set of authorized apps 120 for user 106 that would include system app 300 [Sa300], and would exclude other non-authorized apps. If in this example, there are a set of 100 client apps 112, UMS 102 may append the list of authorized apps 120 with the list of client apps 112 to which the user 106 has access, for example [Sa300, Ca100]. In this example, the list of 300 system apps 110 may be a first data source, the list of 100 client apps 112 may be a second data source, and UMS 102 may generate the list of authorized apps based on the user identifier, role, or other information from a user profile. In another embodiment, a first set of potentially available apps to the user 106 may be generated by UMS 102 joining or executing a union operation of the authorized system apps 110 with the authorized client apps 112.

In some embodiments, a preliminary set of recommended apps 108 may be generated from this list of authorized apps 120. In some embodiments, the recommended apps 108 may include the list of authorized apps 120 as well as the user's frequently used apps 116. As a frequently used app 116, a presumption can be made that the user 106 has been previously authorized to use frequently used apps 116 such that the authorization process based on user profile and client permissions is not needed.

In some embodiments, the frequently used apps 116 may be from those frequently used by a group of users to which user 106 is a member. That is, a frequently used app 116 used by a peer user in the same group within the company may be combined with the authorized apps 120 to generate the recommended apps 108 (e.g., even if the user 106 has not used the app or used it frequently). In some embodiments, the initial list of authorized apps 120 generated from system apps 110 and client apps 112 can be reduced by the frequently used apps 116 (either based on the usage of a user 106 or the usage of a group to which user 106 is a member) to generate the recommended apps 108. That is, UMS 102 may cross-reference the authorized apps 120 with the frequent apps 116 and filter out or remove the frequent apps 116 from the list of recommended apps 108. This may help prevent any apps which the user 106 is already using on a regular basis from being displayed in the recommended apps 108 list.

Thus, a first version of recommended apps 108 may be i) the combination of authorized apps 120 generated from system apps 110 and client apps 112, ii) the combination of authorized apps 120 generated from the system apps 110 and clients apps 112 with frequently used apps 116 added or iii) the combination of authorized apps 120 generated from system apps 110 and clients apps 112 where any authorized apps 120 that are common with the frequently used apps 116 are removed.

Once a first set of recommended apps 108 are generated, UMS 102 may also filter out or remove saved/favorite apps 118 from this initial list of recommended apps 108. This may help prevent any apps about which the user 106 is already aware and has saved as a saved/favorite app 118 from being displayed in the recommended apps 108 list.

In some embodiments, system apps 110 and client apps 112 may include the same or a duplicate app. For example, the system apps 110 may already include word processing app WP1. The client apps 112 may also include the same word processing app WP1, which the particular client is recommending their employees use for word processing. UMS 102 may review the remaining list of recommended apps 108, and remove any duplicate apps, such as WP1 that exist in both the authorized system apps and authorized client apps may be removed. This will help prevent the same app from being displayed or recommended twice to the user 106 via the recommended apps 108.

In some embodiments, UMS 102 may remove the duplicate app from the system apps 110 list. This may be advantageous, because this may inform the user 106 that WP1 as contained in the recommended apps 108 list is coming from their organization or company, which would likely be more important or relevant to the user than if the WP1 was recommended by a system developer outside the company or organization of the user 106.

In some embodiments, the recommended apps 108 may indicate which apps are system apps 110 and which apps are client apps 112. In some embodiments, recommended apps 108 may also include a list of third party apps created neither by the developer or provider of UI 104 or its related system, the organization or company for which the user 106 works or is associated.

In some embodiments, a recommendation engine 124 may generate and maintain the list of recommended apps 108. In some embodiments, the recommendation engine 124 may remove apps with similar or overlapping functionality from the recommended apps list 108. In some embodiments, an app may include a reco_flag 122. Recommendation engine 124 may identify which apps have the reco_flag 122 set. The reco_flag 122 may be an indicator used by a developer of an app to indicate that it is the latest version of the app or a set of functionality.

For example, a client may develop a first app 1. Different versions of this app 1 may be released, and new users would by default get the latest version. The newest version of app 1 may include the reco_flag 122 as being set to true, while older versions may be set to false, or removed altogether.

However, the client may later release app 2, which includes some or all of the functionality of app 1, but in a new app. The developer of app 2 may mark the reco_flag 122 of app 2 as being true, and may turn off or mark as false the reco_flag 122 of app 1. In some embodiments, the reco_flag 122 may indicate what other apps the instant app is related to. For example, reco_flag of app 2 may indicate (true, app 1), which may indicate that this is the recommended app (true) relative to app 1. As such, if the recommended apps list 108 included both app 1 and app 2, recommendation engine 124 would know to remove app 1 from the list.

In some embodiments, the reco_flag 122 may include multiple apps listed. For example, app 3 may include a reco_flag 122 of (true, app 1, app 2). Then, for example, both apps 1 and 2 may be removed from the list of recommended apps 108, or otherwise provide apps 1 and 2 with a lower priority relative to app 3. App 3 may include at least a subset of similar or even identical functionality as app 2, but may be a new app and not an upgraded version of app 2.

The reco_flag 122 may help reduce user confusion, and avoid displaying multiple apps with similar, or overlapping functionality, and may avoid displaying outdated or no longer supported apps. In some embodiments, there may be users who are still using app 1, so it may not be able to remove app 1 from the system entirely.

The result of the above-referenced processing may be the recommended apps list 108, from which duplicate and redundant apps have been removed. In some embodiments, UMS 102 may modify UI 104 to display or make prominent the recommended apps 108 in a recommended apps section of UI 104. In some embodiments, UMS 102 may generate the recommended apps section of UI 104, and populate it with the topmost recommended apps (e.g., 5 topmost apps). Or UMS 102 may periodically update the recommended apps section of UI 104, each time the recommended apps 108 has been updated. In some embodiments, UMS 102 may highlight any changes or new apps added to the list relative to the previous user login(s).

In some embodiments, UMS 102 may automatically download and make available the recommended apps 108 such that they are ready to use when displayed on UI 104, thus preventing the user from having to request and wait for a download of the apps. In some embodiments, UMS 102 may provide a visual indicator identifying which of the recommended apps 108 are system apps 100 and client apps 112 (and/or third party apps).

In some embodiments, the recommended apps 108 may recommend one or more other apps displayed on UI 104 for the user 106 to replace with a new app from the recommended apps 108. For example, if UI 104 includes app 2 in the saved/favorite apps 118, but app 3 has been crated to replace app 2, recommended apps 108 may include a recommendation to replace app 2 with app 3. If the user 106 selects 'yes' on this recommendation, UMS 102 may transfer any transferable data from app 2 to app 3, delete app 2 from UI 104, and replace app 2 with app 3.

In some embodiments, recommend apps 108 may include a visual indication as to which apps are frequently used by other users in the same role or project as user 106, but which do not yet appear on UI 104. For example, as noted above, tracking system 114 may track which users are using which apps, and may use this information to recommend apps to other users in the same organization, role, with similar experience/education level, on the same projects, etc.

Figure 2A:
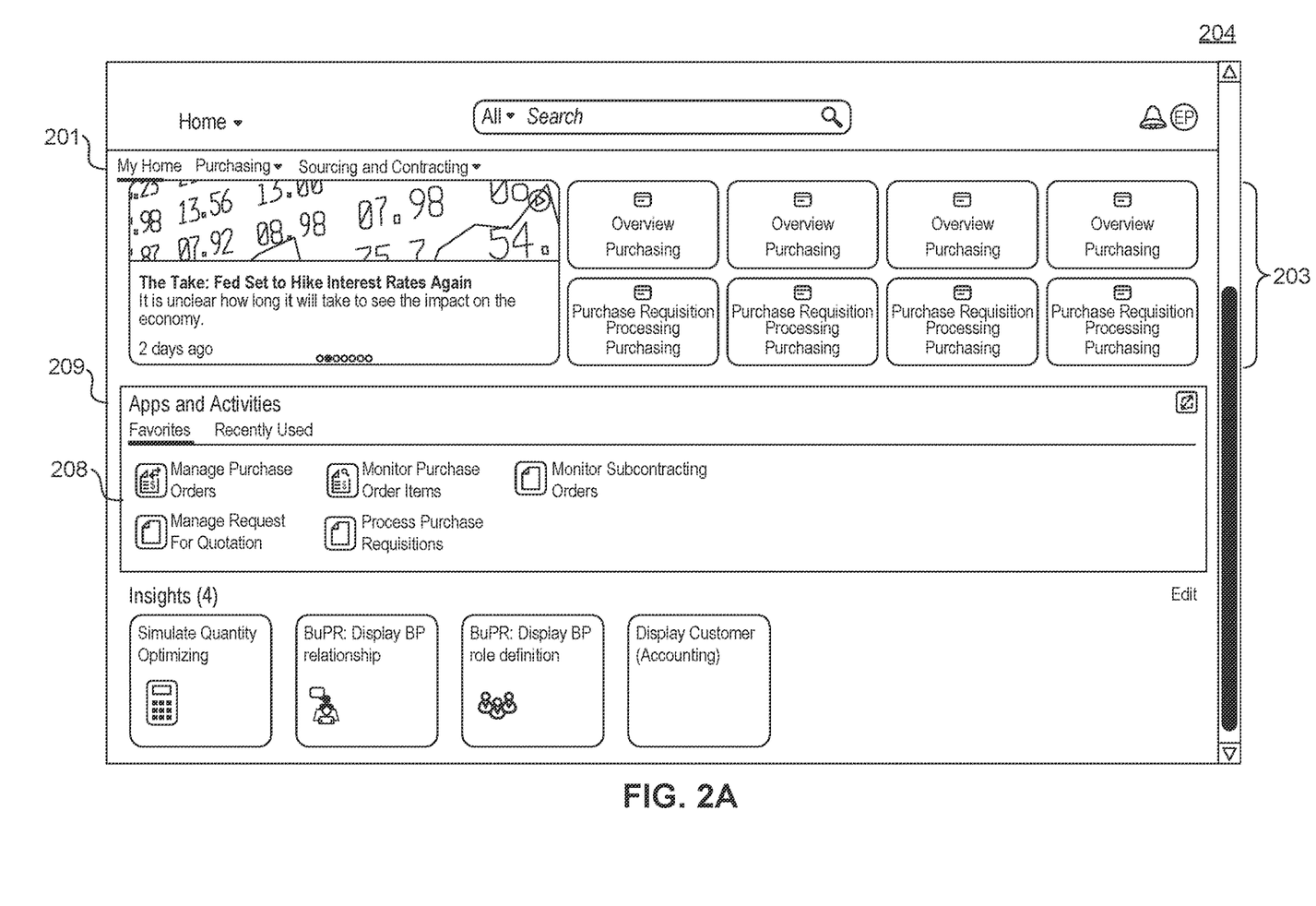
FIGS. 2A-2C each illustrate a block diagram of an example user interface for a user modification and recommendations system (UMS), according to some example embodiments.
Figure 2B:
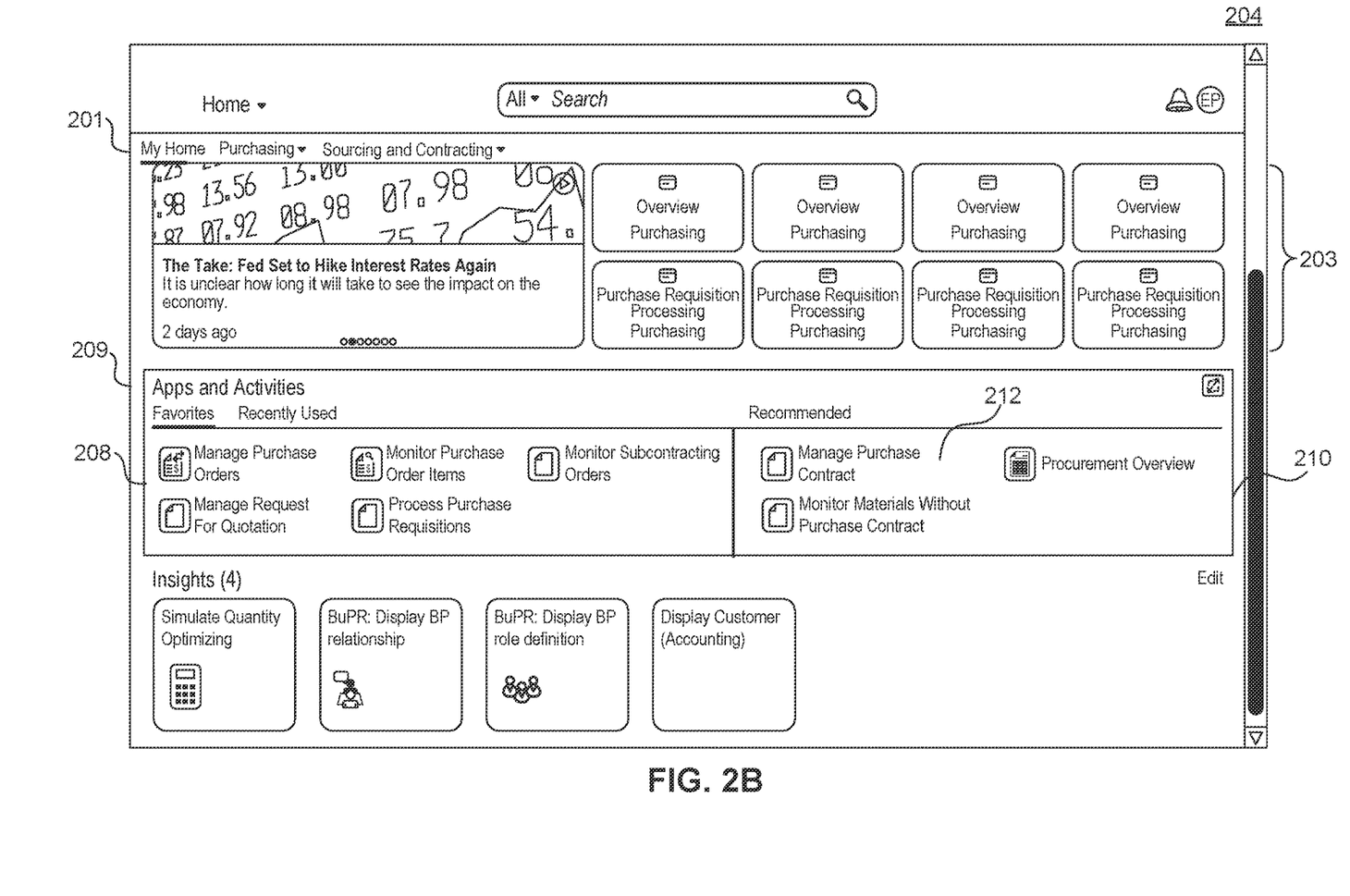
Figure 2C:
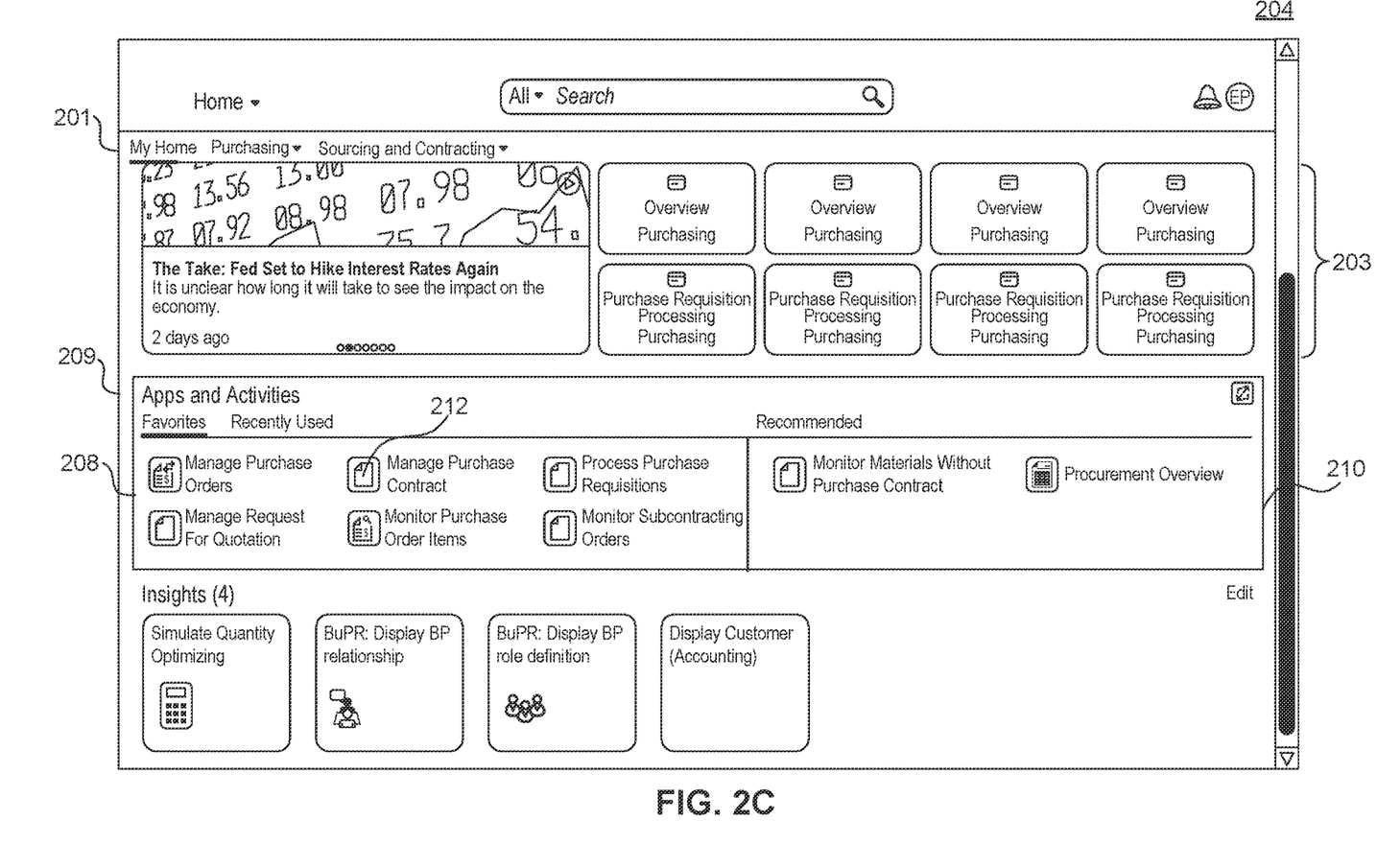

FIGS. 2A-2C illustrates a group of example user interfaces 204 for a user modification and recommendations system (UMS) 102, according to some example embodiments. UI 204 may be an example of UI 104 of FIG. 1.

In FIG. 2A, UI 204 may include a menu section 201 with some built in functionality, and a section 203 including news or headlines update and other system default functionality. Section 209 of FIG. 2A illustrates that there are two exemplary categories of apps displayed on UI 204, favorites and recently used. The user may select favorites tab and the saved/favorites apps 118 illustrated in section 208 of UI 204. Alternatively, if the user selects the recently used section, those apps used recently (e.g., within the last 24 hours, 48 hours, week, or some set time period) may be displayed in section 208 (in lieu of the saved/favorite apps 118).

FIG. 2B shows an updated user interface 204 (e.g., relative to FIG. 2A). In FIG. 2B, UMS 102 may reduce the size of or shrink section 208 to make room for section 210. In some embodiments, this may include reducing the size of the icons/text in section 208, or removing icons, or adding a scroll bar. In some embodiments, one or more saved/favorite apps can be removed from the user interface, but still remain on a list of saved/favorite apps (or may otherwise become accessible by using a scroll bar, menu icon, or other visual display element). In section 210, UMS 102 may display the list of recommended apps alongside the current favorites apps displayed in section 208. One such recommended app is 212 titled Manage Purchase Contract.

FIG. 2C shows an updated user interface 204 (e.g., relative to FIGS. 2B and 2A). In FIG. 2C, the Manage Purchase Contract app 212 has been moved over into the favorites section 208. This movement of a recommended app 212 into the favorites section 208 can be accomplished in several ways. One such way is for the user 106 to perform the move directly, such as a drag-and-drop action. Another such way is for the UMS system 102 to automatically move the app based on an instruction from a client administrator. In such situations, the user's employer may deem that certain apps are required to be used by its employees such that those recommended apps are automatically moved to the favorites section 208. In yet another scenario, the recommend apps (e.g., such as recommended app 212) may be automatically moved to the favorites section 208 after a certain amount of time has elapsed unless the user 106 opts out of having certain recommended apps become listed in the favorites section 208.

Figure 3:
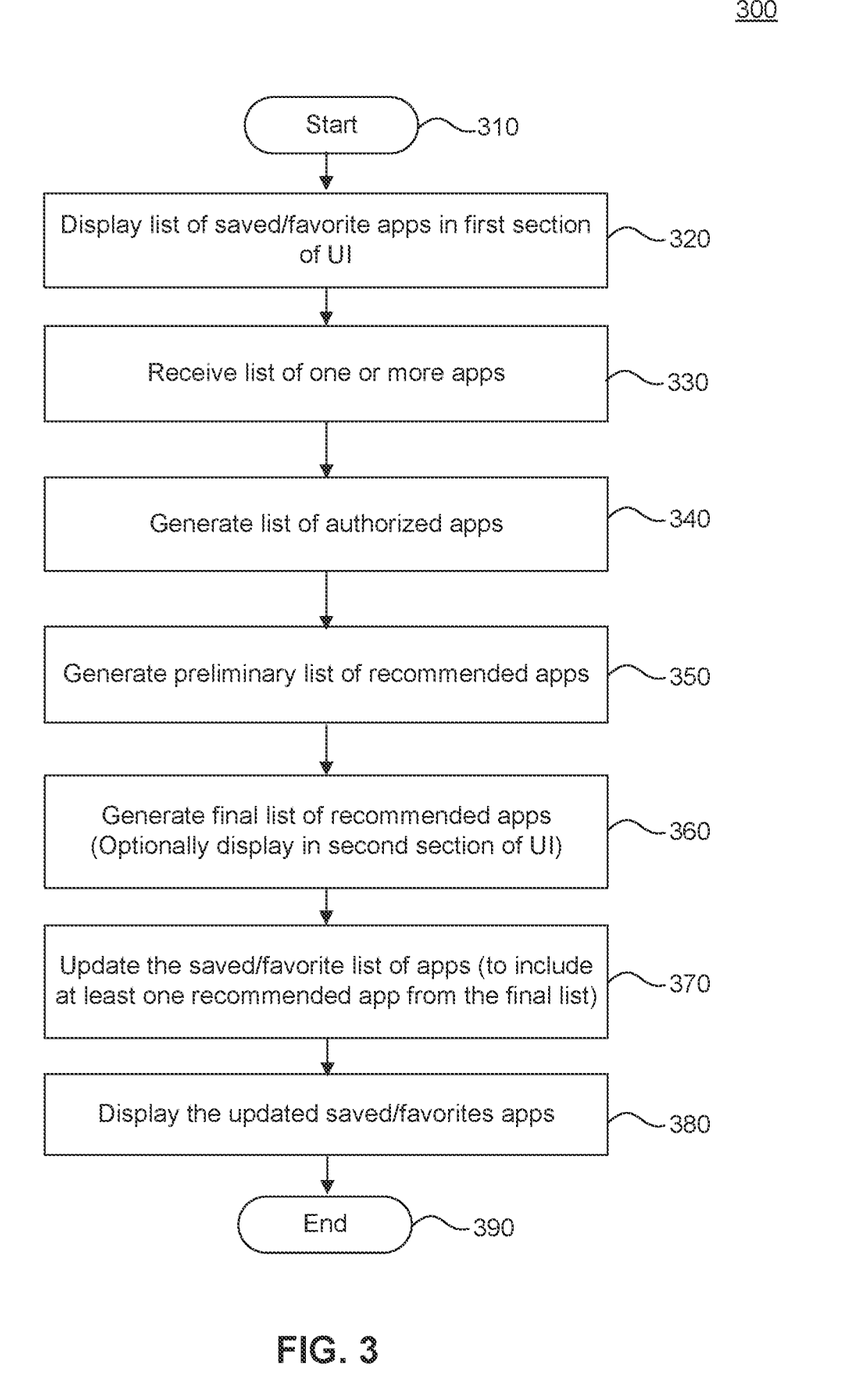
FIG. 3 is a flowchart illustrating a process for a user modification and recommendations system (UMS), according to some embodiments.

FIG. 3 is a flowchart illustrating a process 300 for a user modification and recommendations system (UMS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, process 300 is started. This can occur either automatically or user 106 may initiate the process via user interface 204. When process 300 is initiated automatically, it can occur based on a scheduled or periodic basis (e.g., once a month), if a threshold number of new or updated apps are provided or added in either system apps 110, client apps 112 or combination of both, or if an employer wishes to push out an app to its employees.

In 320, a user interface such as 204 can be displayed to a user that includes a current listing of saved/favorite apps 118. It should be noted that the display in 320 can occur before, during or after start 310.

In 330, a list of one or more apps is received. This list of apps may be compiled in a variety of different ways. For example, UMS 102 may identify or receive a first plurality of apps that include a set of system apps 110 developed by a system developer. In some embodiments, the system developer may be the same organization or company that is providing UI 104 and/or a backend system or device (not shown) to which UI 104 connects. In some embodiments, UI 104 may be a portal that allows access to data and/or functionality provided by a particular organization or system. The portal of UI 104 may then be accessible and configurable by various clients who develop client apps 112. Some of the apps in the initial list of apps, a user 106 may not be authorized to use or access.

The list may also include either in addition to, or instead of, the system apps 110 previously mentioned, a second plurality of apps that include a set of client apps 112 developed by an organization with a set of users 106 who have access to portal or UI 104.

In 340, a list of authorized apps associated with a user is generated. The authorized apps are those apps for which a particular user is allowed to access and use. As noted above, the list of authorized apps may include one or more of the first plurality of apps, one or more of the second plurality of apps or a combination of apps from both the first and second plurality of apps. The list of authorized apps may be generated by taking the list of one more apps from 330 and determining if a particular user has a user profile that matches a set of permissions associated with each app in the list from 330. For example, UMS 102 may identify which system apps 110 a user 106 logged into the UI 104 is authorized to use or access. In some embodiments, UMS 102 may request from a client which client apps 112 the user 106 is authorized to use or access. In some embodiments, UMS 102 may be able to generate the list of authorized apps 120 from information stored in a user profile about the user identifier corresponding to user 106 with a set of permissions.

In 350, a preliminary list of recommended apps is generated. In some embodiments, the preliminary list of recommended apps may be the same as the list of authorized apps from 340. In alternative embodiments, the preliminary recommended apps may be generated by adding to or removing from the authorized list any apps that are frequently used.

In 360, a final list of recommended apps is generated. In one embodiment, the final list of recommended apps is generated by taking the preliminary list form 350 and removing any apps listed in a saved/favorites list. In some embodiments, the final list of recommended apps may be displayed in a second section of a user interface.

In 370, the list of saved/favorite apps is updated or modified by including at least one app from the final list of recommended apps added into the list of saved/favorite apps.

In 380, a first section of a user interface that displays the saved/favorite apps is updated to include the at least one app from the final list of recommended apps. In some embodiments, this updating the display, may be performed by UMS 102 visually moving or animating a movement of the at least one app from a second section of the UI 204, to the first section of the UI 204. The process then ends at 390.

In some embodiments, UMS 102 may automatically move the topmost apps from the recommended apps section of the UI 104 to a different section of the UI 104, such as saved/favorite apps 118. In some embodiments, the automatically moved recommended apps may include a visual indication (e.g., such as green highlighting) indicating to the user that these apps were automatically moved to or around the UI 104 by UMS 102 and are recommended for the user 106. In some embodiments, the user 106 may then click on any of the highlighted apps and accept the recommendation (which may remove the green highlighting) or reject the recommendation, in which case the app may be moved back to the recommended apps list 108.

Figure 4:
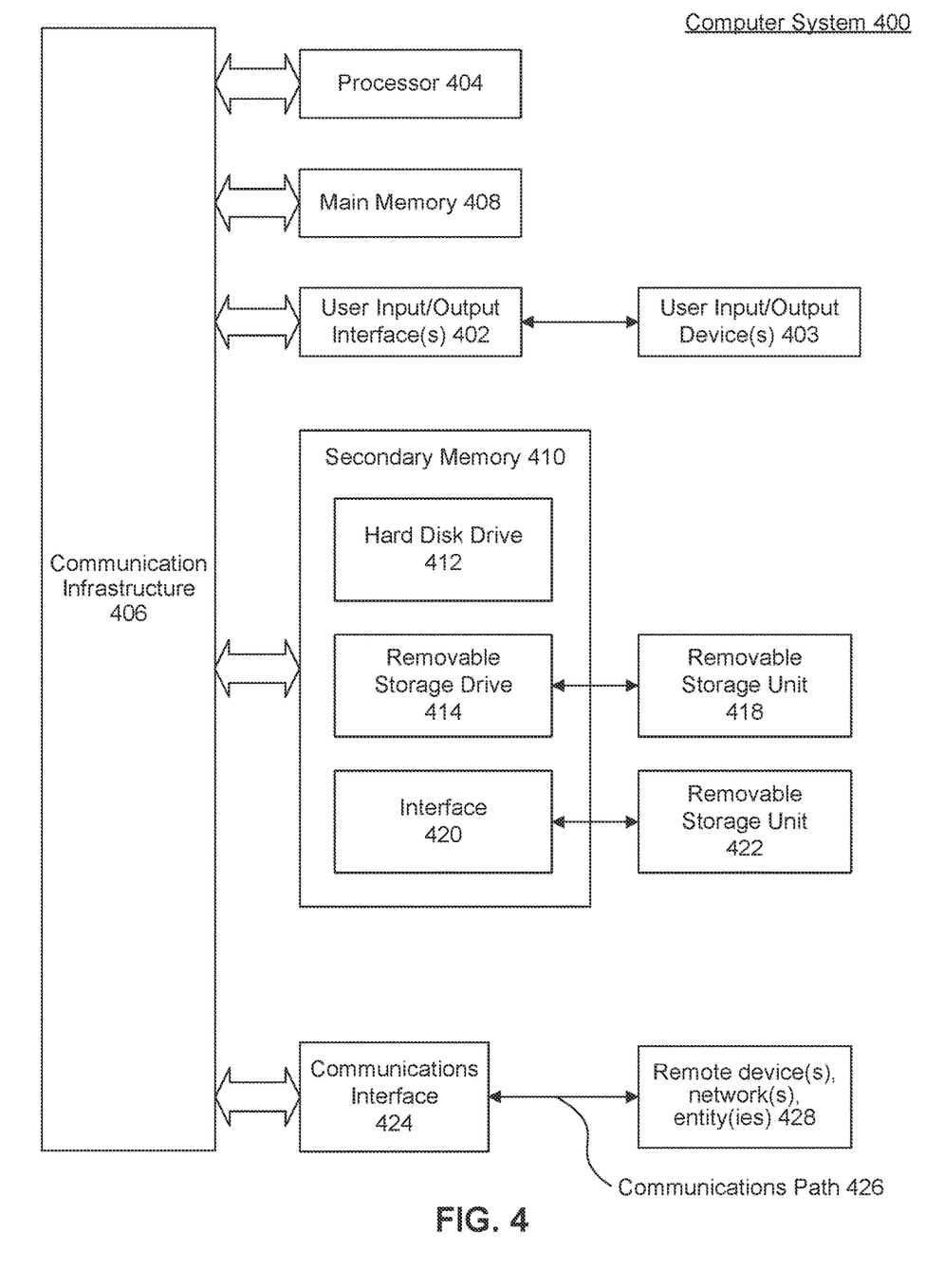
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 can be used to implement any embodiments, and/or any combination or sub-combination thereof.

Computer system 400 includes one or more processors (also called central processing units, or CPUs), such as a processor 404. Processor 404 is connected to a communication infrastructure or bus 406. Computer system 400 may represent or comprise one or more systems on chip (SOC).

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, memory card, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   displaying in a first section of a user interface a plurality of saved/favorite apps of a first user based on a list of saved/favorite apps of the first user;
   receiving a first list of apps available to a plurality of users of a client system;
   generating a list of authorized apps, which the first user is authorized to access, from the first list of apps wherein the generating the list of authorized apps comprises comparing a user profile of the first user with permissions provided by the client system;
   generating a preliminary list of recommended apps from the list of authorized apps;
   generating a final list of recommended apps from the preliminary list of recommended apps by copying the preliminary list of recommended apps into the final list of recommended apps and then removing all the saved/favorites apps of the first user from the final list of recommended apps;
   updating the list of saved/favorite apps by adding at least one app from the final list of recommended apps to the list of saved/favorite apps; and
   updating the first section of the user interface presented to the first user by adding the at least one app from the final list of recommended apps to the first section of the user interface in accordance with the updated list of saved/favorite apps.

2. The method of claim 1, further comprising:
   identifying a first data source comprising a first plurality of apps developed by a first developer associated with a system that provides the user interface;
   identifying a second data source comprising a second plurality of apps developed by a second developer associated with the client system;
   wherein the list of authorized apps include one or more of the first plurality of apps and one or more of the second plurality of apps.

3. The method of claim 2, further comprising:
   identifying that the final list of recommended apps comprises both a first app from the first developer and a second app from the second developer with similar functionality based on metadata associated with the first app and the second app; and
   providing, for display via the user interface, both the first app and the second app, including a visual indication that the first app is associated with the first developer and the second app is associated with the second developer.

4. The method of claim 2, further comprising:
   identifying that the final list of recommended apps comprises both a first app from the first developer and a second app from the second developer associated with the client system with similar functionality based on metadata associated with the first app and the second app; and
   removing the first app from the final list of recommended apps based on the identifying the second app from the second developer associated with the client system has similar functionality as the first app.

5. The method of claim 1, wherein the generating the preliminary list comprises:
   identifying one or more frequently used apps that have been frequently used by the first user; and
   removing the one or more frequently used apps from the preliminary list.

6. The method of claim 1, further comprising:
   identifying a group of users from the plurality of users including the first user;
   identifying one or more frequently used apps that have been frequently used by one or more of the group of users; and
   adding the one or more frequently used apps to the final list of recommended apps.

7. The method of claim 6, wherein the one or more frequently used apps have not been used by the first user.

8. The method of claim 1, wherein the generating the final list of recommended apps comprises:
   identifying two or more apps from the final list of recommended apps with similar functionality based on metadata associated with the two or more apps; and
   identifying a recommended app from the two or more apps based on a recommendation flag set by a developer of the recommended app, wherein the recommendation flag comprises an indication of which one of the two or more apps is recommended for use by the first user.

9. The method of claim 8, wherein a first app of the two or more apps has been replaced with a
   second app of the two or more apps, wherein the second app is recommended, and wherein
   the second app is not an updated version of the first app.

10. The method of claim 1, wherein the updating the first section of the user interface comprises:
    removing one or more saved/favorite apps of the plurality of saved/favorite apps displayed in the first section of the user interface, wherein the removed one or more saved/favorite apps remains on the list of saved/favorite apps, but is no longer displayed in the user interface.

11. The method of claim 1, wherein the updating the first section of the user interface comprises:
reducing a size of one or more of the plurality of saved/favorite apps displayed in the user interface.

12. The method of claim 1, wherein the updating the first section of the user interface comprises:
automatically moving the at least one app from a second section of the user interface where the at least one app was displayed, to the first section of the user interface.

13. The method of claim 12, wherein the automatically moving comprises:
highlighting the at least one app moved from the second section of the user interface to the first section of the user interface.

14. A system comprising at least one processor, the at least one processor configured to perform
operations comprising:
displaying in a first section of a user interface a plurality of saved/favorite apps of a first user based on a list of saved/favorite apps of the first user;
receiving a first list of apps available to a plurality of users of a client system;
generating a list of authorized apps, which the first user is authorized to access, from the first list of apps wherein the generating the list of authorized apps comprises comparing a user profile of the first user with permissions provided by the client system;
generating a preliminary list of recommended apps from the list of authorized apps;
generating a final list of recommended apps from the preliminary list of recommended apps by copying the preliminary list of recommended apps into the final list of recommended apps and then removing all the saved/favorites apps of the first user from the final list of recommended apps;
updating the list of saved/favorite apps by adding at least one app from the final list of recommended apps to the list of saved/favorite apps; and
updating the first section of the user interface presented to the first user by adding the at least one app from the final list of recommended apps to the first section of the user interface in accordance with the updated list of saved/favorite apps.

15. The system of claim 14, the operations further comprising:
identifying a first data source comprising a first plurality of apps developed by a first developer associated with a system that provides the user interface; and
identifying a second data source comprising a second plurality of apps developed by a second developer associated with the client system;
wherein the list of authorized apps include one or more of the first plurality of apps and one or more of the second plurality of apps.

16. The system of claim 15, the operations further comprising:
identifying that the final list of recommended apps comprises both a first app from the first developer and a second app from the second developer with similar functionality based on metadata associated with the first app and the second app; and
providing, for display via the user interface, both the first app and the second app, including a visual indication that the first app is associated with the first developer and the second app is associated with the second developer.

17. The system of claim 15, the operations further comprising:
identifying that the final list of recommended apps comprises both a first app from the first developer and a second app from the second developer associated with the client system with similar functionality based on metadata associated with the first app and the second app; and
removing the first app from the final list of recommended apps based on the identifying the second app from the second developer associated with the client system has similar functionality as the first app.

18. The system of claim 14, wherein the generating the final list of recommended apps comprises:
identifying two or more apps from the final list of recommended apps with similar functionality based on metadata associated with the two or more apps; and
identifying a recommended app from the two or more apps based on a recommendation flag set by a developer for the recommended app, wherein the recommendation flag comprises an indication of which one of the two or more apps is recommended for use by an end user.

19. A non-transitory computer-readable medium having instructions stored thereon that, when
executed by at least one computing device, cause the at least one computing device to
perform operations comprising:
displaying in a first section of a user interface a plurality of saved/favorite apps of a first user based on a list of saved/favorite apps of the first user;
receiving a first list of apps available to a plurality of users of a client system;
generating a list of authorized apps, which the first user is authorized to access, from the first list of apps wherein the generating the list of authorized apps comprises comparing a user profile of the first user with permissions provided by the client system;
generating a preliminary list of recommended apps from the list of authorized apps;
generating a final list of recommended apps from the preliminary list of recommended apps by copying the preliminary list of recommended apps into the final list of recommended apps and then removing all the saved/favorites apps of the first user from the final list of recommended apps;
updating the list of saved/favorite apps by adding at least one app from the final list of recommended apps to the list of saved/favorite apps, and
updating the first section of the user interface presented to the first user by adding the at least one app from the final list of recommended apps to the first section of the user interface in accordance with the updated list of saved/favorite apps.

20. The non-transitory computer-readable medium of claim 19, the operations further
comprising:
identifying a first data source comprising a first plurality of apps developed by a first developer associated with a system that provides the user interface; and
identifying a second data source comprising a second plurality of apps developed by a second developer associated with the client system;

wherein the list of authorized apps include one or more of the first plurality of apps and one or more of the second plurality of apps.

\* \* \* \* \*